May 14, 1968   S. NOVAK   3,382,941
CALORIE WEIGHING DEVICE
Filed March 21, 1966
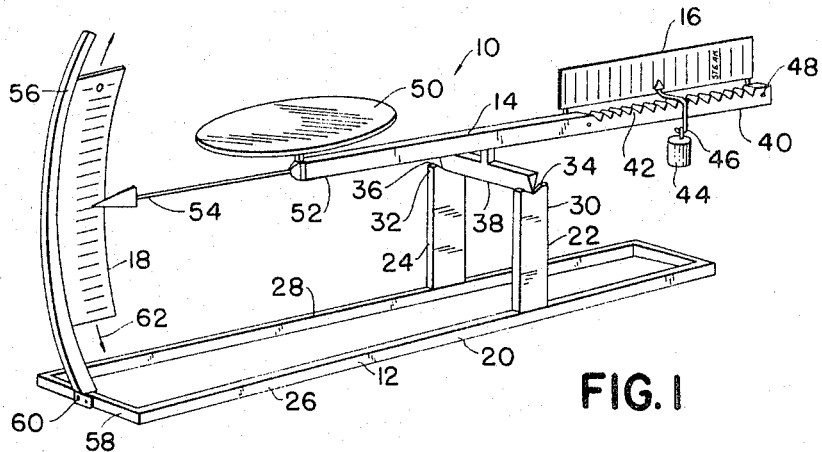
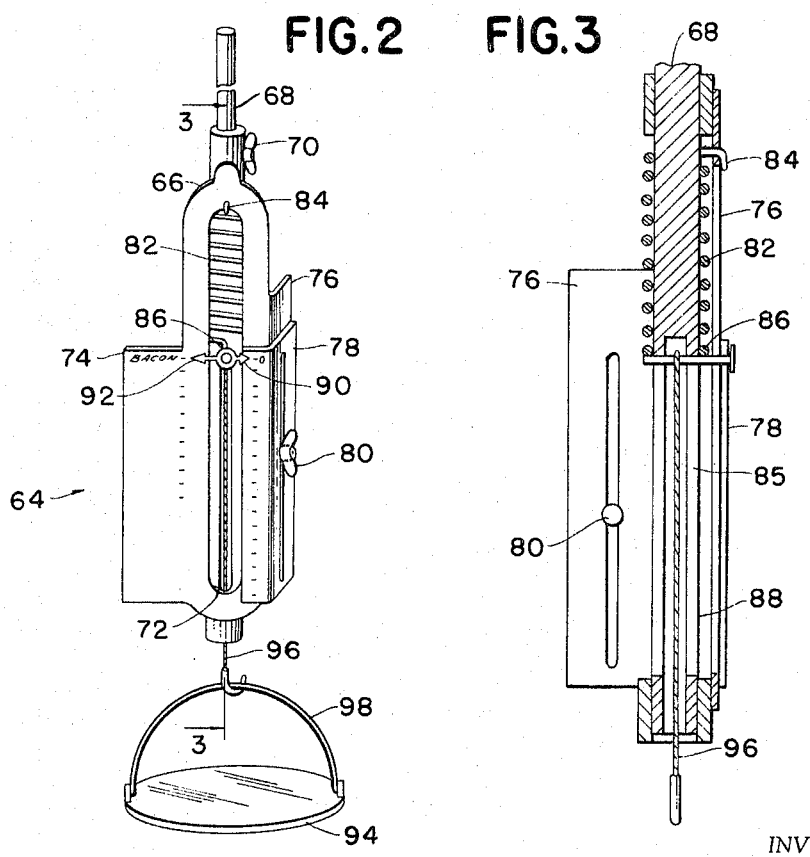
INVENTOR.
STANLEY NOVAK
BY Whittemore,
Hulbert & Belknap
ATTORNEYS 3,382,941
CALORIE WEIGHING DEVICE
Stanley Novak, St. Clair Shores, Mich., assignor to
Thomas Novak, St. Clair Shores, Mich.
Filed Mar. 21, 1966, Ser. No. 535,847
7 Claims. (Cl. 177—1)

ABSTRACT OF THE DISCLOSURE

Structure for directly determining the calorie content of different portions of selected foods including weighing means for receiving the portion of the selected food the calorie content of which it is desired to determine, means for compensating the weighing means for the type of food selected, a scale for directly reading the calorie content of the food placed on the weighing means and means for adjusting the scale to provide a zero indication with no food on the weighing means and the weighing means compensated for the selected food the calorie content of which it is desired to determine and the corresponding method of directly determining the calorie content of a quantity of a particular food including compensating the weighing means for the selected type of food, adjusting the scale to provide a zero indication with no food on the weighing means, placing the desired portion of selected food on the weighing means and reading directly the calorie content of the desired portion of food from the scale.

In one modification the weighing means comprises a beam balance having an arcuate read-out scale which is movable arcuately about the pivot of the balance to provide a zero indication in any compensated condition thereof. In a second modification the weighing means is a spring scale.

---

The invention relates to weighing devices and refers more specifically to means for directly determining the number of calories in a portion of a plurality of different foods.

Calorie counting has become a way of life for many people who have a tendency toward obesity. Thus many people count the number of calories they take in every day.

Calorie counting as presently accomplished generally takes the form of estimating the size of food, for example a piece of steak one quarter, by two, by three inches, or a medium size chop or a small tomato or a large celery stalk approximately eight inches long, before looking up the number of calories therein in a book listing calories in the common foods. This method of calorie counting is inherently inaccurate due to the estimate required and is time consuming and tedious due to the requirement for looking up each separate food in a calorie listing book.

It is therefore one of the objects of the present invention to provide structure for directly determining the number of calories in any portion of known food.

Another object is to provide structure for directly determining the number of calories in portions of different types of food including weighing means, means for selecting a ratio of calories per weight for the type of food to be considered, means for directly indicating the number of calories in a portion of the type of food placed on the weighing means, and means for adjusting the indicating means to read zero calories for each type of food after the ratio of calories per weight has been selected.

Another object is to provide structure for directly determining the number of calories in food comprising a balance including a balance beam, an adjustable weight positioned on one end of the balance beam next to a scale indicating particular food, a weighing tray on the other end of the balance beam, and indicator means operably associated with the other end of the balance beam reading directly in calories.

Another object is to provide structure for directly determining the number of calories in food comprising a scale including a body member, an opening through said body member, an elongated slot in said body member, a fixed scale of separate foods on the body member adjacent one side of said slot, an adjustable scale of calories positioned adjacent the other side of said slot, an elongated rod adjustably secured in said opening extending lengthwise of said slot and having a slot therein, a spring surrounding said rod secured at one end to the body member at one end of the slot therein, the other end of which is slidably secured in the slot in the rod, a pair of pointers for the scales and a weighing tray secured to the other end of the spring.

Another object is to provide an improved method of directly determining the number of calories in portions of different types of food comprising adjusting weighing apparatus having an indicator thereon to provide a predetermined ratio between indicator movement and a type of food to be weighed thereon, placing a portion of the type of food on the weighing apparatus and directly reading from the indicator the number of calories in the portion of food weighed.

Another object is to provide an improved method of directly determining the number of calories in portions of different types of food as set forth above, including the step of setting the indicator to zero indication before placing the food to be weighed on the weighing apparatus.

These and other objects and features of the invention will become apparent as the description proceeds especially when taken in conjunction with the accompanying drawing illustrating preferred embodiments of the invention wherein:

FIGURE 1 is a perspective view of balance structure for directly reading the number of calories in portions of different food, constructed in accordance with the invention.

FIGURE 2 is a perspective view of scale structure for directly reading the number of calories in portions of different food, constructed in accordance with a modification of the inventtion.

FIGURE 3 is an enlarged longitudinal section view of a portion of the scale illustrated in FIGURE 2 taken substantially along the line 3—3 in FIGURE 2.

With particular reference to the figures of the drawing, one embodiment of the invention will now be described in detail.

As shown in FIGURE 1, the balance structure 10 for directly reading the number of calories in a portion of food weighed thereon comprises a base 12, a balance beam 14, a food scale 16 and an indicating scale 18. In operation the type of food to be weighed is chosen on the food scale 16, the portion of the food which it is desired to determine the calories in is placed on the balance beam, and the number of calories in the portion of food is read directly from the indicator scale 18.

More specifically, the base 12 includes the rectangular frame 20 having the vertically extending members 22 and 24 projecting upwardly from the opposite sides 26 and 28 thereof. The upper ends 30 and 32 of the vertical members 22 and 24 are terminated in upwardly opening V-shaped notches 34 and 36 respectively.

The balance beam 14 is constructed integrally with or is secured to a pivot bar 38 which has a V-shaped cross section as shown to provide a knife edge in each of the V-shaped notches 34 and 36 of the base 12. The balance beam 14 is thus freely pivotally mounted centrally.

The right end 40 of the balance beam 14, as shown in FIGURE 1, is provided with a plurality of notches 42 therealong in which the weight 44 is positioned by the supporting and indicating member 46. The supporting and indicating member 46 is operable in conjunction with the food scale 16 which is secured to the end 40 of the balance beam 14 by convenient means such as the pins 48 so that the weight 44 properly counterbalances the balance beam 14 to permit movement of the beam 14 with food on the weighing tray 50 at the other end 52 of the balance beam 14 in the correct ratio of calories to weight of the particular food.

An indicator arrow 54 is secured to the left end of the balance beam 52 as shown in FIGURE 1, and in conjunction with the sliding calorie scale 18 secured to the arcuate slide 56 provides a direct reading of the calories of a particular food weighed. As shown in FIGURE 1, the slide 56 is secured to the end 58 of the base 12 by convenient means, such as screws 60. The scale 18 is movable arcuately about the pivot mounting of balance beam 14 in the direction of the arrows 62 along the slide 56 to maintain alignment of the scale 18 and the indicator 54 and has sufficient frictional contact with the slide 56 to maintain itself in any selected position on the slide 56.

Thus in overall operation of the balance 10, if it is for example desired to determine the number of calories in a piece of steak the adjustable weight 44 is moved into a position on the end 40 of the balance beam 14 where the supporting and indicating member 46 indicates "steak." The balance beam 14 will then assume a predetermined pivotal position about the pivot mounting member 38 at which time the adjustable calorie scale is moved to position the 0 indication thereon opposite the tip of the indicator arrow 54. The steak is then placed on the weighing tray 50 on the end 52 of the balance beam 14 at which time the balance beam 14 will be rotated counterclockwise, as shown in FIGURE 1, about the pivot mounting member 38 a distance depending on the position of the weight 44 and the weight of the steak on the weighing tray 50 such that the true calorie count of the portion of steak on the tray will be indicated on the calorie scale directly.

The scale 64 illustrated in FIGURES 2 and 3 is similar in operation to the balance 10 and in construction includes the body member 66 having the rod 68 supported therein for movement longitudinally therethrough and adjustable by means of the wing nut 70. Body member 66 includes the elongated slot 72 therein extending axially of the rod 68 and has an extension 74 having a fixed food scale thereon. The body member 66 is further provided with an extension 76 to which an adjustable calorie scale 78 is secured by the wing nut 80.

The variable rate counterbalancing spring 82 surrounds the shaft 68 and is connected at the upper end 84 to the body member 66. The lower end 86 of spring 82 is slidably secured in the slot 85 in the lower end 88 of the shaft 68. The pointers 90 and 92 are connected together and are secured to the lower end 86 of the spring 82. Weighing tray 94 is secured to the bail 98 connected to the wire support 96 which in turn is connected to the lower end 86 of spring 82.

Thus, in operation, with the body member 66 rigidly supported, the wing nut 70 is loosened and the shaft 68 adjusted so that the pointer 92 is opposite the type of food on scale 74 it is desired to determine the calories in, after which the wing nut 70 is locked in position. The wing nut 80 is then loosened and the adjustable calorie scale 78 is positioned so that the 0 indication is opposite the pointer 90. The wing nut 80 is then tightened and as the indicated food is placed on the tray 94 the direct reading of the calories in the food will be obtained by reading the calorie indication adjacent the pointer 90.

While one embodiment of the present invention and a modification thereof have been considered in detail, it will be understood that other embodiments and modifications of the invention are contemplated; for example, the indicator might be electric, hydraulic or mechanically operated by gears or the like. It is therefore the intention to include all embodiments and modifications as are defined by the appended claims within the scope of the invention.

What I claim as my invention is:

1. Structure for directly determining the number of calories in portions of different types of food, comprising balance beam weighing means including a balance beam having a pivot point and a first indicator and structure for receiving a portion of food secured to one end of the balance beam, an arcuate calorie scale positioned adjacent the first indicator adjustable on an arc centered about the pivot point of the balance beam, a weight movable along the other end of the balance beam, a second indicator movable with said weight and a second scale positioned on said balance beam for indicating different types of food at predetermined points along the other end of the balance beam.

2. Structure as set forth in claim 1, wherein the said other end of the balance beam is provided with transverse notches therein for receiving the second indicator at the predetermined points along the other end of the balance beam.

3. Structure for directly determining the number of calories in portions of different types of food, comprising weighing means for receiving a quantity of food the calorie content of which it is desired to determine directly, means for compensating the weighing means in accordance with the particular calorie to weight ratio of the particular food it is desired to know the calorie content of, indicator means for directly reading the calorie content of the particular food positioned on the compensated weighing means and separate means for adjusting the indicator means to provide a zero calorie indication with the weighing means compensated and with no food on the weighing means.

4. Structure as set forth in claim 3, wherein the weighing means is a beam balance, the compensating means is a first scale positioned on one end of the beam balance and a weighted indicator movable along the one end of the beam balance for registration with the first scale in accordance with the type of food the calorie content of which it is desired to directly determine.

5. Structure as set forth in claim 3, wherein the weighing means comprises a beam balance having a pivot and the indicator means for directly reading the calorie content of food positioned on the weighing means comprises an indicator extending axially from one end of the balance beam, an arcuate scale positioned adjacent and registerable with the indicator and means for moving the arcuate scale about the pivot of the beam balance to provide a zero indication with the beam balance in any compensated condition.

6. Structure as set forth in claim 3, wherein the weighing means is a spring balance and the means for directly reading the calorie content of food positioned on the weighing means comprises an indicator movable in accordance with the weight of material positioned on the spring balance and a movable scale for providing a zero calorie indication with the spring balance in any compensated condition with no food positioned on the spring balance.

7. The method of directly determining the calorie content of different foods comprising compensating weighing means for the particular weight calorie ratio of the food the calorie content of which it is desired to read directly, adjusting means operably associated with the weighing means to provide a zero calorie indication with the weighing means compensated, placing the food the calorie content of which it is desired to read directly on the weighing means and reading the calorie content of the food on the weighing means directly from the indicating means.

References Cited

UNITED STATES PATENTS

| 247,761 | 10/1881 | Hopkins | 177—175 XR |
| 451,677 | 5/1891 | Wright | 177—167 |
| 490,518 | 1/1893 | Swihart | 177—172 XR |
| 739,035 | 9/1903 | Triner | 177—173 |
| 2,172,281 | 9/1939 | Higley | 177—172 XR |
| 2,314,387 | 3/1943 | Carlsson | 177—34 XR |
| 2,707,592 | 5/1955 | Rice | 235—78 |

ROBERT S. WARD, JR., *Primary Examiner.*